July 20, 1943.  A. L. PARKER  2,324,464
VALVES FOR FUEL TANKS
Filed March 31, 1941　　3 Sheets-Sheet 1
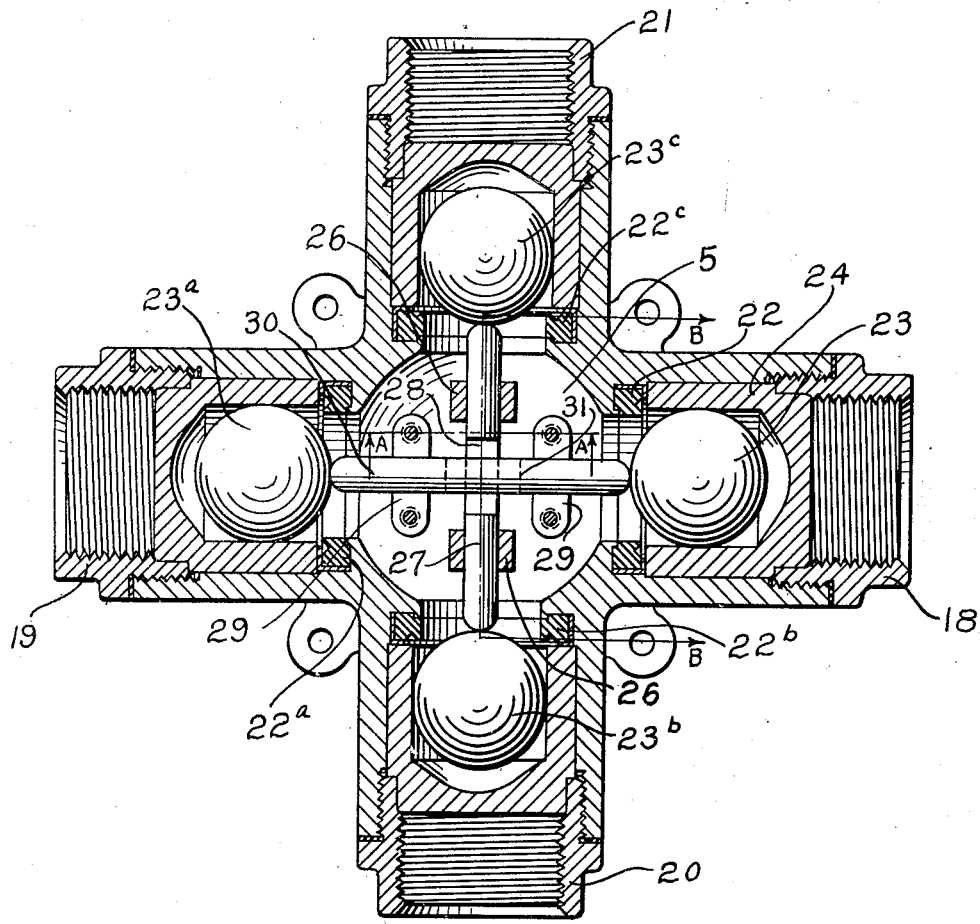
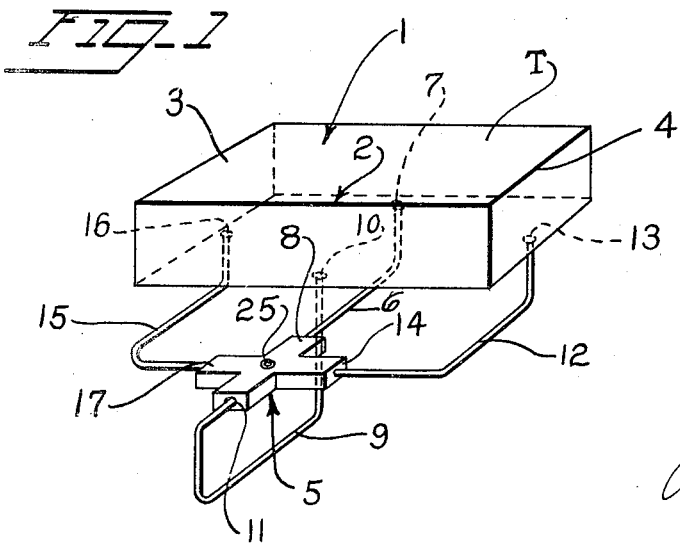
Inventor
Arthur L. Parker
By
Mason & Porter
Attorneys

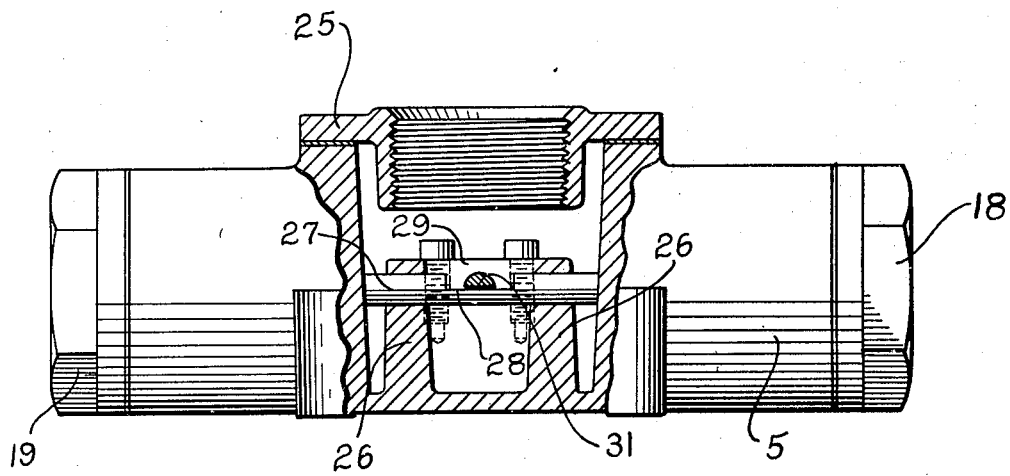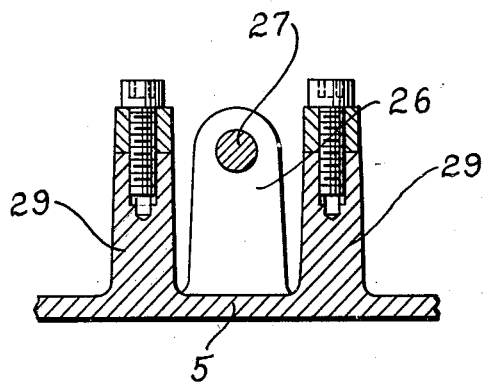

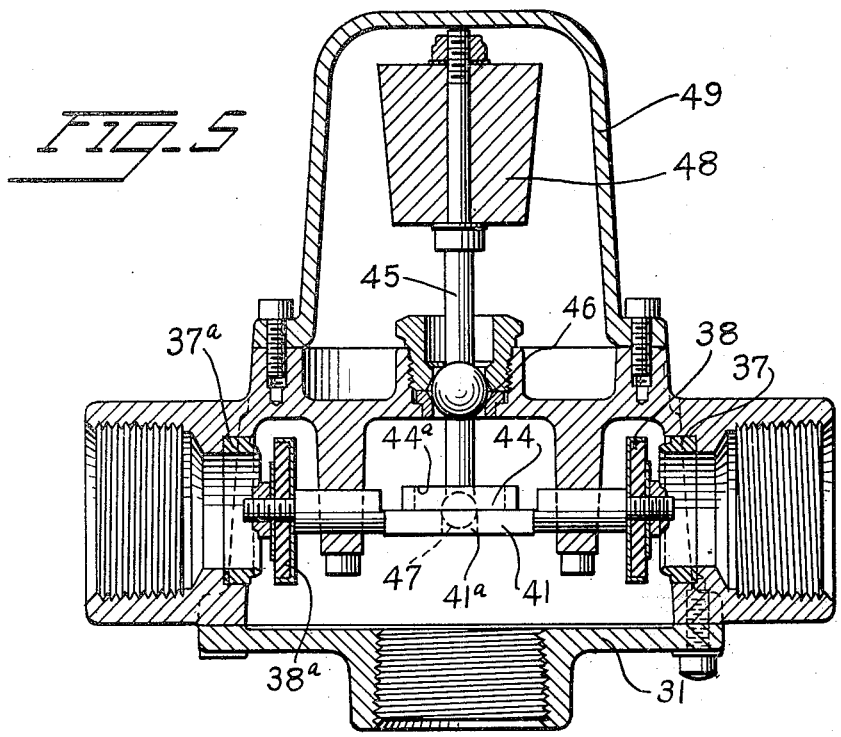
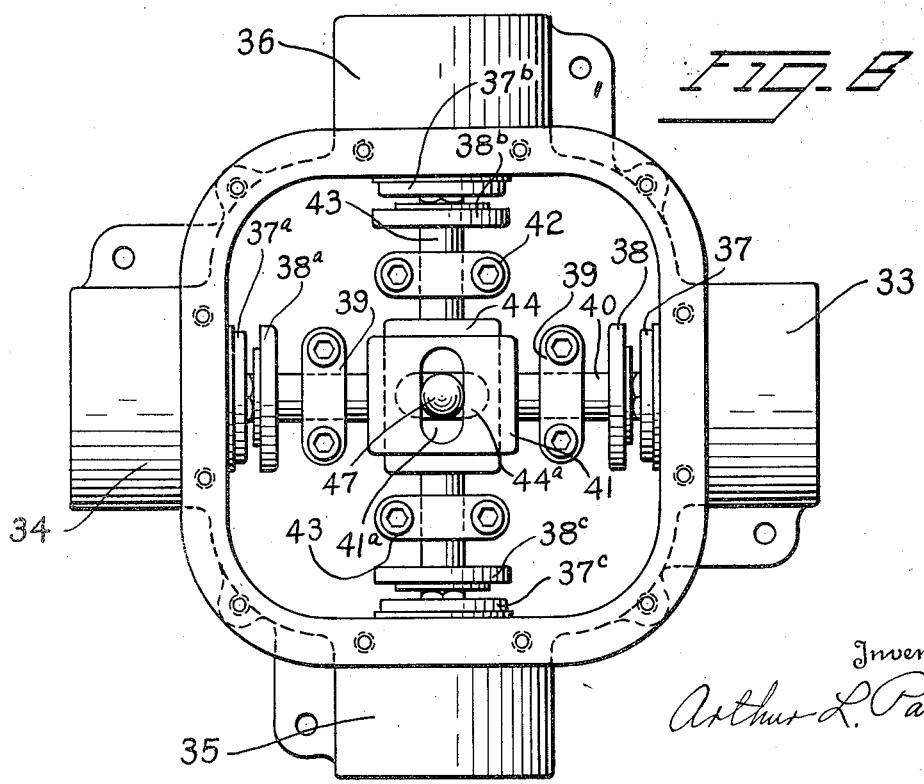

Patented July 20, 1943

2,324,464

UNITED STATES PATENT OFFICE 2,324,464

VALVE FOR FUEL TANKS

Arthur L. Parker, Cleveland, Ohio

Application March 31, 1941, Serial No. 386,212

3 Claims. (Cl. 137—21)

The invention relates to new and useful improvements in a sump selector valve for use in connection with the fuel supply tank in an airplane. In my co-pending application Serial No. 383,421, filed March 14, 1941, I have shown and claimed a sump selector valve associated with fuel supply pipes connected to the fuel supply tank at remote points, preferably one near the rear side of the tank and the other near the front side of the tank, which sump selector valve is so constructed that gravity-actuated valves therein will control the dispensing pipes whereby fuel will be supplied solely from the pipe leading to the lowermost position in the tank during its tilting movements.

An object of the present invention is to provide supply pipes leading not only from the front and rear sides of the tank, but also from opposite sides of the tank so that these pipes are connected at four widely separated points, and to construct a sump control means including gravity-actuated valves for controlling the dispensing pipes whereby fuel will be supplied from the pipe or pipes leading to the lowermost position in the tank during the forward and aft tilting movements of the airplane and also during banking.

A further object of the invention is to provide a separate gravity-actuated valve for each dispensing pipe, and a means associated with the opposed valves which insures that said opposed valves cannot both seat at the same time and thus cut off the supply of fuel.

In the drawings—

Figure 1 is a perspective view showing diagrammatically a supply tank, a sump selector valve mechanism and the arrangement of the pipes relative to the tank and said valve mechanism;

Fig. 2 is a horizontal sectional view through the sump selector valve mechanism;

Fig. 3 is a sectional view on the line B—B of Figure 2;

Fig. 4 is a sectional view on the line A—A of Figure 2;

Fig. 5 is a vertical sectional view through the sump selector valve showing a modified form of control mechanism for the valves, and Fig. 6 is a bottom plan view of the sump selector valve mechanism shown in Figure 5, with the cover plate removed.

In Figure 1 of the drawings there is shown diagrammatically a tank T for the fuel supply for an airplane. The tank is placed in the airplane so that the end 1 thereof is at the rear relative to the direction of flight, while the end 2 is at the front. The sides 3 and 4 are at the opposite sides of a line extending lengthwise of the airplane.

Associated with the fuel supply tank and rigidly mounted on the airplane for tilting movements with the tank is a sump selector valve mechanism 5. A pipe 6 is connected at the point 7 to the tank, which point is adjacent the rear side or end 1 of the tank. This pipe 6 leads into the sump selector housing at the rear side thereof as indicated at 8. A pipe 9 is connected to the tank at the point 10, which is adjacent the front end or side 2 of the tank, and this pipe is connected to the sump selector valve housing at 11, which is the front end of the housing relative to the direction of flight. A pipe 12 is connected to the tank at the point 13 which is adjacent the side wall 4 of the tank, and this pipe is connected to the sump selector valve housing at 14 which is at one side of a center line through the housing. A pipe 15 is connected to the tank at the point 16 which is adjacent the side 3, and this pipe is connected at 17 to the sump selector valve housing which is the side opposite the point where the pipe 12 is connected thereto.

The sump selector valve mechanism is very similar to that shown in my co-pending application referred to above. The housing 5 includes suitable means whereby it may be attached to the frame of the airplane so as to tilt fore and aft and transversely as the airplane tilts.

The pipe 6 is threaded into an adapter 18 which is attached to the rearwardly projecting arm of the valve housing. The pipe 9 is threaded into the adapter 19 at the end of the forwardly projecting arm of the housing. The pipe 12 is connected to an adapter 20 threaded into a laterally projecting arm of the valve housing, and the pipe 15 is threaded into an adapter 21 connected to a projecting arm at the opposite side of the valve housing. There is a valve in each of the projecting arms and they are similarly constructed so that the description of one will answer for the others.

Secured in the housing at the inner end of each arm is a valve seat 22 with which a ball valve 23 is adapted to cooperate. This ball valve 23 is mounted in a guiding cage 24 having spaced arms for guiding the ball, and a means for limiting the movement of the ball away from the seat 22. An adapter holds the cage in place, and the cage abuts the valve seat 22. The valve seat associated with the adapter 19 has been numbered 22a, and the ball valve cooperating therewith 23a. The valve seat for the arm carrying the adapter 20 is numbered 22b and the ball valve is numbered 23b. The valve seat associated with the adapter 21 is numbered 22c and the ball valve 23c.

Attached to the valve housing centrally thereof is a pipe connector 25 into which a pipe is threaded which leads to the fuel system for supplying fuel thereto. This pipe connector 25 closes a central chamber in the housing which is connected through the valve seats to the respective pipes leading to the tank.

Mounted on the valve housing are two spaced pillars 26, 26. Mounted for reciprocation in these pillars is a rod 27. The rod is preferably round and is cut away intermediate the ends thereof as indicated at 28 in Figures 2 and 3. There is also a pair of pillars 29, 29 attached to the valve housing in which is mounted a rod 30. This rod 30 has a cut-away portion indicated by the broken line 31, in Figure 2, and indicated by the line 31 in Figure 3. These rods are mounted for free endwise movement in the pillars which support the same, and they are disposed centrally of the opposed ball valves with which they are associated. The rods are at right angles to each other as shown in the drawings. The rods are dimensioned so that when one ball valve moves into engagement with the seat associated therewith, the other ball valve is held off from its seat. These ball valves move by gravity.

When the airplane is on the ground, it is tilted upward so that the fuel lies at the back end of the tank. The sump selector housing is likewise tilted so that the ball valve 23 will move away from its seat, while the ball valve 23a will move into engagement with its seat. If there is no lateral tilting of the airplane, then the ball valves 23b and 23c may be, as shown in the drawings, in neutral position with both valves open, or one of the valves might be closed. The fuel from the engine at this time will be drawn principally through the pipe 5 leading to the rear side or end 1 of the tank. If the supply in the tank is low at this time, the connection 10 between the pipe 9 and the tank may be uncovered, but no air will be sucked into the fuel supply line because the valve 23a will have moved into contact with the seat 22a by gravity.

When during flight the airplane is tilted downward so that the connection 7 of the pipe 5 to the tank may be uncovered, then the ball valve 23 will move by gravity into engagement with the valve seat 22 and prevent air from being sucked through the pipe 5 into the supply line. If during flight and banking, the airplane tilts so that the side 4 becomes the low side of the tank and the pipe connection 16 is uncovered, then the ball valve 23c will move by gravity into engagement with the valve seat 22c and prevent any air from being sucked into the supply line through this pipe connection. Let us suppose that the airplane is both tilted upwardly and banked at the same time so that the connections 10 and 16 are likely to be uncovered as the fuel moves to the opposite rear corner of the tank. At this time, both the valves 23a and 23c will move by gravity into engagement with their respective seats and close the pipes 9 and 15. The two valves 23 and 23b may be at this time off from their seats and fuel supplied from both of the pipes associated therewith.

It will readily be seen from the above description that my improved sump control valve mechanism will operate so as to insure that fuel will be supplied from the lowermost pipe or pipes, while the pipes which are likely to be exposed by the shifting of the fuel to one side or the other, or to one corner or the other, will be closed so that no air will be sucked into the fuel supply line.

In Figures 5 and 6 of the drawings, there is shown a slightly modified form of valve operating mechanism. In this form of the invention the valve housing 31 is provided with a pipe connection 32 which leads to the supply line. There is a pipe connection 33 which is connected to the line 6 leading to the tank, a pipe connection 34 which is connected to the line 9, a pipe connection 35 which is connected to the line 12, and a pipe connection 36 which is connected to the line 15. Associated with each pipe connection is a valve seat, which valve seats are numbered 37, 37a, 37b and 37c, respectively. Associated with each valve seat is a valve, which valves have been numbered 38, 38a, 38b and 38c, respectively.

Mounted for endwise reciprocation in a pair of spaced hangers 39, 39 is a rod 40 connected to a rectangular plate 41. The valves 38 and 38a are connected to the opposite end of the rod 40. Extending at right angles to the rod 40 and reciprocating in hangers 42, 42 is a rod 43 which is connected to a rectangular plate 44. The plate 44 has a longitudinal slot 44a formed therein and the plate 41 has a longitudinal slot 41a.

A vertically arranged bar 45 is provided with a ball intermediate its ends, and this ball is mounted in a bearing 46 in the valve housing. The bar at the lower end carries a ball head 47 which is located in part in the longitudinal slot 41a and in part in the longitudinal slot 44a. At the upper end of this bar 45 is a weight 48. The valve housing has a cap 49 which covers this weight, but permits the weight to move freely without contact therewith during the tilting of the airplane forward and aft, or during tilting laterally during banking.

As shown in Figure 5, the valve housing and tank are in a substantially level position, and at this time both valves 37 and 37a are open. If the airplane is tilted upwardly, as in starting, then the weight 48 will move to the right as viewed in Figure 5, closing the valve 38a and opening the valve 38 to the supply. During banking, the weight will shift so as to control the valves 38b and 38c just as the ball valves are controlled by gravity in connection with the form of the invention shown in Figures 1 to 4.

It is not thought that any further description of the operation of the sump selector valve mechanism is necessary. In either form illustrated, it is obvious that the weight on the upper end of the rod, or the weight of the valves, will cause the valves to close and to open so that the fuel is withdrawn from the dispensing pipe or pipes which are connected to the lowermost points of the tank in its tilted position.

It is obvious that many changes in the details of construction may be made without departing from the spirit of the invention as set forth in the appended claims.

Having thus described the invention, what I claim as new and desire to secure by Letters Patent, is:

1. The combination of a fuel tank for aircraft said tank having end and side walls, said fuel tank having outlets arranged in two pairs at the bottom thereof, said pairs being disposed in lines substantially at right angles to each other with the outlets of one pair adjacent the end walls and the outlets of the other pair adjacent the side walls, a valve housing mounted in fixed relation to said tank, said valve housing having intake ports arranged in pairs and in lines corresponding to the pairs and lines of outlets in the fuel tank, and pipes connecting said valve housing intake ports with said tank outlets, a valve seat associated with each intake port, and a valve cooperating with each valve seat, said valve being gravity-actuated independently in response to the tilting of the tank for controlling the intake ports so that when the tank is in a tilted position fuel will be supplied from the pipe or pipes leading from the lowermost portion of the tank and the other intake ports will be closed.

2. The combination of a fuel tank for aircraft said tank having end and side walls, and a valve housing for distributing fuel from the tank mounted in fixed relation to said tank and with the center of the valve housing in a plane passing substantially centrally through the tank parallel with the end walls thereof, said valve housing having intake ports disposed upon opposite sides of said plane and in a line parallel with the sides of the tank, a pipe connected to one of said ports and to the bottom of the tank adjacent the end thereof which is on the same side of said central plane, a pipe connected to the other intake port and to the bottom adjacent the other end of the tank, said valve housing having other intake ports disposed in a line passing centrally through the valve housing and disposed in said central plane, a pipe connecting the intake port at the rear side of the valve housing with the bottom of the tank adjacent the rear wall thereof and a pipe connecting the intake port at the front side of the valve housing with the bottom of the tank adjacent the front wall thereof, said valve housing having a distributing port located centrally thereof, a valve seat associated with each of the first mentioned ports, and a valve adapted to cooperate with each valve seat for closing the respective ports, said valves being gravity-actuated independently in response to the tilting of the tank for controlling the intake ports so that when the tank is in a tilted position, fuel will be supplied from the pipe or pipes leading from the lowermost portion of the tank and the other intake ports will be closed.

3. An outlet system for a tiltable fuel tank comprising a valve housing tiltable with the tank, said valve housing having intake ports disposed in a horizontal plane when said valve housing is in non-tilted position, said intake ports being arranged in two pairs with the pairs in lines substantially at right angles to each other, a valve seat associated with each intake port, a ball valve adapted to move into and out of engagement with each seat, guiding means for each ball said ball valves being disconnected from and free to move independently of the others, control rods mounted in the valve housing for endwise movement, each of said rods being disposed in a line centrally through the valves of the pair with which said rod is associated, said rods being dimensioned so that when one valve of a pair is seated the other valve is held off its seat.

ARTHUR L. PARKER.